Patented July 14, 1936

2,047,657

UNITED STATES PATENT OFFICE 2,047,657

MANUFACTURE OF N-SUBSTITUTED CYANO-FORMARYLIDES

Max Wyler, Blackley, Manchester, England, assignor to Imperial Chemical Industries Limited, a corporation of Great Britain No Drawing. Application April 8, 1935, Serial No. 15,313. In Great Britain April 12, 1934

4 Claims. (Cl. 260—99.30)

This invention relates to the manufacture of N-substituted cyano-formarylides.

It is an object of this invention to provide a new and improved process for the manufacture of N-substituted cyano-formanilides. Other and further important objects of this invention will appear as the description proceeds.

In British Patent No. 306,450 there is described the preparation of N-substituted cyano-formarylides of the general formula ArN(R)COCN where Ar stands for a substituted or unsubstituted aryl radical and R stands for a substituted or unsubstituted aryl or alkyl radical which may be free or linked directly to the radical Ar to form a closed ring, by interacting an acid chloride of the general formula ArN(R)COCl, where Ar and R stand for the same radicals as before, with hydrocyanic acid in pyridine.

According to the present invention I manufacture the said N-substituted cyano-formarylamides, including N-alkyl-formanilides, by interacting the said acid chlorides with cuprous cyanide at elevated temperature.

An advantage of my process is that it avoids the use of the highly toxic hydrocyanic acid. N-substituted cyano-formarylamides may be used in the manufacture of intermediates for dyestuffs.

The following example in which parts are by weight illustrates but does not limit the invention.

Example 300 parts of N-ethyl-N-phenyl-carbamyl-chloride

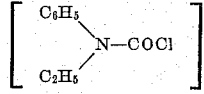

are mixed with 225 parts of cuprous cyanide and heated in a vessel provided with condenser and agitator at 160–170° C. When the conversion is practically complete, which is shown by the fact that the filtrate from a solution of a sample in methanol precipitates only traces of potassium chloride when warmed with a solution of caustic potash in methanol, and which needs about 6 hours, the melt is cooled to 100° C., extracted with 1200 parts of hot ligroin boiling at about 80–100° C., from which the cyanide crystallizes in large cubic crystals, M. P. 50–51° C. The yield is over 90% of theory.

According to British Patent 306,450, the yield of N-ethyl-cyano-formanilide by the process of that specification is 74% of theory. In a similar manner the chlorides of other alkyl-formanilides (for instance, methyl-phenyl-carbamyl-chloride or propyl-phenyl-carbamyl-chloride or those mentioned in British Patent 306,450) may be condensed to give the corresponding N-alkyl-cyano-formanilides. If desired, the reaction may be carried out in the presence of a solvent or diluent. Other variations and modifications are possible in my preferred mode of procedure, as will be readily understood by those skilled in the art.

I claim:

1. The process of producing an N-substituted cyano-formarylide of the general formula

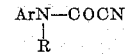

wherein Ar stands for an aryl radical and R is a member of the group consisting of an aryl radical, a free alkyl radical, and an alkyl radical linked directly to the radical Ar to form a closed ring, which comprises heating a compound of the general formula

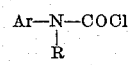

wherein Ar and R have the same significance as above with cuprous cyanide.

2. The process of producing an N-alkyl-cyano-formanilide, which comprises heating the corresponding N-alkyl-N-phenyl-carbamyl chloride with cuprous cyanide.

3. The process of producing an N-alkyl-cyano-formanilide, which comprises heating the corresponding N-alkyl-N-phenyl-carbamyl chloride with an excess of cuprous cyanide under reflux temperature.

4. The process of producing N-ethyl-cyano-formanilide, which comprises heating substantially 300 parts of N-ethyl-N-phenyl-carbamyl-chloride with substantially 225 parts of cuprous cyanide at a temperature of 160–170° C.

MAX WYLER.